J. & C. BEARDEN.
SAW FILING GAGE.
APPLICATION FILED OCT. 18, 1911.
1,029,966.
Patented June 18, 1912.
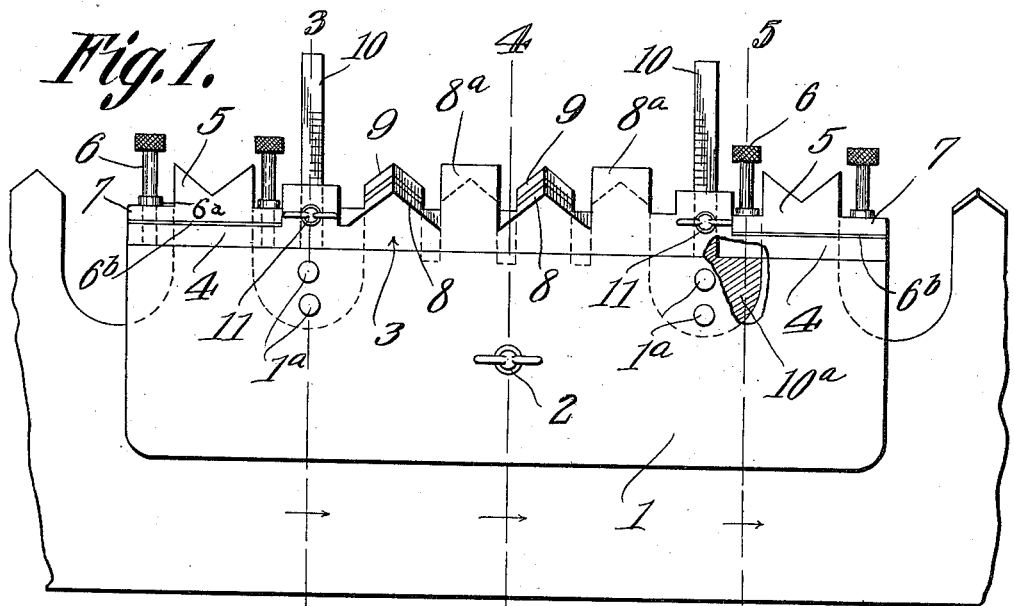
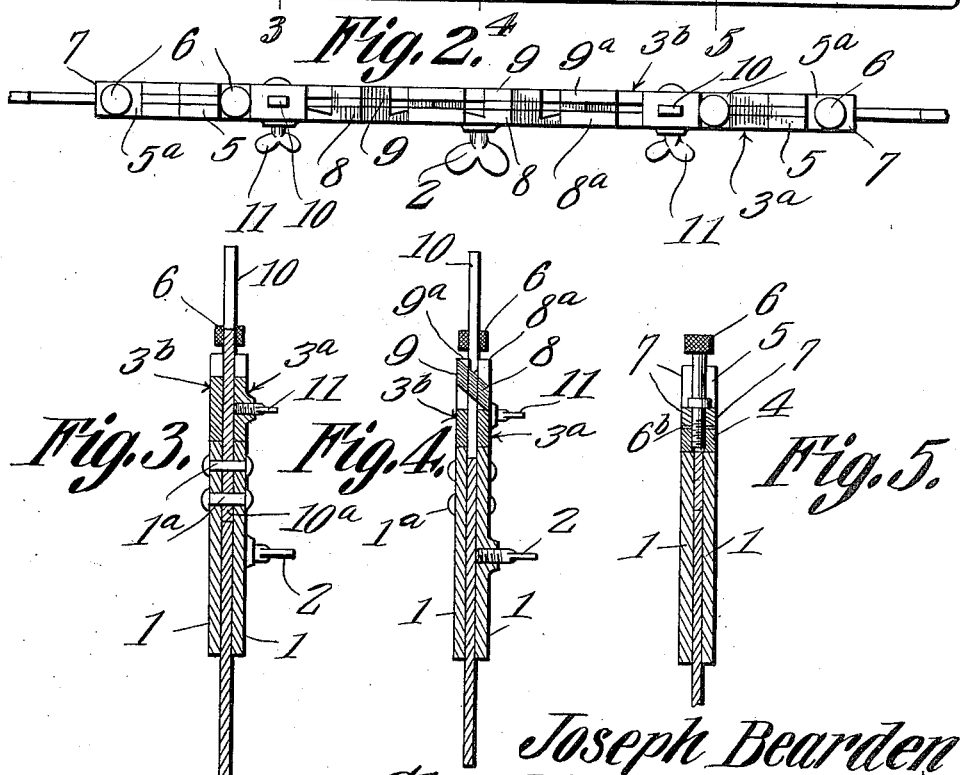
Witnesses
Joseph Bearden and
Charlie Bearden Inventors,
by
Attorneys.

UNITED STATES PATENT OFFICE.

JOSEPH BEARDEN AND CHARLIE BEARDEN, OF HERMITAGE, ARKANSAS.

SAW-FILING GAGE.

1,029,966.  Specification of Letters Patent.  Patented June 18, 1912.

Application filed October 18, 1911. Serial No. 655,346.

*To all whom it may concern:*

Be it known that we, JOSEPH BEARDEN and CHARLIE BEARDEN, citizens of the United States, residing at Hermitage, in the county of Bradley, State of Arkansas, have invented a new and useful Saw-Filing Gage, of which the following is a specification.

This invention relates to improvements in what may be termed saw filing gages.

The object of the invention is to provide for suitably controlling or gaging the filing of the saw-teeth, both as relates to the altitude and the bevel thereof.

A further object is to effect this result in a simple, expeditious and effective manner.

The invention consists of certain instrumentalities and features substantially as hereinafter fully disclosed and defined by the appended claims.

In the accompanying drawing illustrating the preferred embodiment of our invention wherein it will be understood that various changes and modifications may be made with respect to the detailed construction and arrangement of the parts without departing from the spirit thereof, Figure 1 is a side elevation of the invention as applied for use to a cross-cut saw, with drag or clearing and cutting or fleam teeth. Fig. 2 is a plan view of the same. Fig. 3 is a section taken on the line 3—3 of Fig. 1. Fig. 4 is a section taken on the line 4—4 of Fig. 1. Fig. 5 is a section taken on the line 5—5 of Fig. 1.

In carrying out our invention we provide opposed suitably secured together plates 1, between which is received the saw, and which saw is suitably clamped or held therebetween by means of a set-screw 2 working about centrally therein, the securing means between said plates being preferably in the form of bolts 1ª inserted therethrough and through interposed adjunctive parts later described.

Superposed with respect to the upper edges of the clamp-plates or members 1 is a gage 3, including spaced-off dual longitudinal members 3ª, 3ᵇ suitably fixed or united at their ends, and between these members is received the toothed edge of the saw-blade for sharpening. The gage-members 3ª, 3ᵇ are reduced in depth at their ends, thus providing narrower end-portions 4, upon which are supported duplicate clearing-tooth like or bifurcated formations or members 5, which register or are in coincidence with "drag" or clearing teeth of the saw-blade. Preferably milled headed adjusting screws 6 are inserted or passed through cross-pieces or connections 5ª between end-extensions 7 of the bifurcated or clearing tooth-like members 5, said screws engaging or entering the narrow end portions 4 of the gage 3, for the relatively fixed retention of the members 5 with respect to the gage 3, the stems of said screws being provided with fixed collars 6ª for engaging the upper surfaces of the extensions 7 of the members 5. By suitably actuating the screws 6, it will be seen that the members 5 may be manually adjusted or moved to accommodate them to saw clearing or drag teeth of different altitudes, the resulting space, between said members and the extensions 4 of the gage 3, being filled-in by inserting therein pieces of any suitable material 6ᵇ as card-board, strips of wood and the like. The clearing or drag-teeth of the saw are received between the transverse uniting connections 5ª of the members 5.

The member 3ª, is provided upon its upper edge with alternating tooth-like projections 8 and rectangular projections or formations 8ª of a given height or altitude while the other member 3ᵇ is also provided upon its upper edge with corresponding opposed alternating tooth-like projections 9 and rectangular projections 9ª of a different height or altitude. The purpose of this arrangement is, as well understood by artisans familiar with this class of devices, to provide for suitably filing the requisite bevel upon the fleam or cutting teeth from one side and at the same time guarding the contiguous teeth which require opposite beveling and to provide for reversing the saw-blade and effect the subsequent opposite beveling of the teeth from the same side.

Suitably notched or gained upright members or stems 10 having lower end enlargements 10ª with lower rounded or convex edges are inserted and held intermediate the clamping or holding members 1 and the gage members 3ª, 3ᵇ, at suitable points, by suitable thumb-piece equipped or winged screws 11, inserted through one of said gage members and engaging said upright members for the adjustment and retension of the gage 3 with respect to the notches upon the upright members or stems 10, in providing for filing teeth of different altitudes, as will be readily appreciated.

What is claimed is:—

1. A device of the character described, including a gage having alternating saw-tooth like beveled projections and guard-forming projections upon its upper edge between and spaced off from said beveled projections.

2. A device of the character described, comprising a gage including opposed spaced off members having upon their upper edges alternating saw-toothed like beveled projections and projections adapted to serve as guards and arranged between said beveled projections.

3. A device of the character described including duplicate spaced-apart gage-members, duplicate spaced-apart raker-tooth like members adapted to be superposed with respect to said gage-members and manually actuated screws having screw-threaded connection with said gage-members and passing unthreaded through said raker-tooth like members, said screws having fixed collars thereon, adapted to engage the upper surface of the latter.

4. A device of the character described, including duplicate spaced-apart gage-members, duplicate spaced-apart raker-tooth like members having reduced end-extensions having connecting cross-pieces, said raker-tooth like members being superposed with respect to said gage-members, and manually actuated screws having screw-threaded connection with said gage-members and passing unthreaded through said end-extensions of said raker-tooth like members, said screws having fixed collars thereon adapted to engage or bear upon said connecting cross-pieces.

5. A device of the character described, including a vertically adjustable gage-member comprising opposed spaced apart members, adapted to receive therebetween a cross-cut saw-blade, a notched or gained upright member having a lower-end enlargement, with a lower rounded or convex edge received within the throat between the saw-blade teeth, and adjusting means for said gage member, adapted to engage said upright notched or gained member.

In testimony that we claim the foregoing as our own, we have hereto affixed our signatures in the presence of two witnesses.

JOSEPH BEARDEN.
CHARLIE BEARDEN.

Witnesses:
B. H. LANGSTON,
T. G. STEPHENSON.

Copies of this patent may be obtained for five cents each, by addressing the "Commissioner of Patents, Washington, D. C."